(12) United States Patent
Yang et al.

(10) Patent No.: US 8,649,191 B2
(45) Date of Patent: Feb. 11, 2014

(54) SYNCHRONOUS RECTIFIER HAVING PHASE LOCK CIRCUIT COUPLED TO FEEDBACK LOOP FOR RESONANT POWER CONVERTERS

(75) Inventors: Ta-Yung Yang, Milpitas, CA (US);
Chou-Sheng Wang, Keelung (TW);
Rui-Hong Lu, Chiayi County (TW)

(73) Assignee: System General Corporation, Sindian, Taipei County (TW)

( * ) Notice: Subject to any disclaimer, the term of this patent is extended or adjusted under 35 U.S.C. 154(b) by 772 days.

(21) Appl. No.: 12/579,462

(22) Filed: Oct. 15, 2009

(65) Prior Publication Data
US 2010/0201334 A1    Aug. 12, 2010

Related U.S. Application Data

(60) Provisional application No. 61/207,334, filed on Feb. 10, 2009.

(51) Int. Cl.
*H02M 3/335* (2006.01)
(52) U.S. Cl.
USPC .................. 363/21.12; 363/21.11; 363/21.15; 363/21.18

(58) Field of Classification Search
USPC ............... 323/222, 271, 280–282; 363/21.11, 363/21.12, 21.15, 21.18
See application file for complete search history.

(56) References Cited

U.S. PATENT DOCUMENTS

| | | | |
|---|---|---|---|
| 7,567,443 B2 * | 7/2009 | Shiga et al. | 363/17 |
| 2007/0121352 A1 * | 5/2007 | Yang et al. | 363/21.15 |
| 2007/0263421 A1 * | 11/2007 | Kyono | 363/127 |

* cited by examiner

*Primary Examiner* — Adolf Berhane
*Assistant Examiner* — Yemane Mehari
(74) *Attorney, Agent, or Firm* — McClure, Qualey & Rodack, LLP

(57) ABSTRACT

A synchronous rectifier for a switching power converter is provided and includes a power transistor, a diode, and a control circuit. The power transistor and the diode are coupled to a transformer and an output of the power converter for the rectification. The control circuit generates a drive signal to switch on the power transistor once the diode is forward biased. The control circuit includes a phase-lock circuit. The phase-lock circuit generates an off signal to switch off the power transistor in response to a pulse width of the drive signal. The pulse width of the drive signal is shorter than a turned-on period of the diode. The phase-lock circuit further reduces the pulse width of the drive signal in response to a feedback signal. The feedback signal is correlated to an output load of the power converter.

13 Claims, 7 Drawing Sheets

SYNCHRONOUS RECTIFIER HAVING PHASE LOCK CIRCUIT COUPLED TO FEEDBACK LOOP FOR RESONANT POWER CONVERTERS

CROSS REFERENCE TO RELATED APPLICATIONS

The present application claims the benefit of U.S. provisional application entitled "Synchronous Rectifier having Phase Lock Circuit Coupled to Feedback Loop for Resonant Power Converters", Ser. No. 61/207,334, filed Feb. 10, 2009.

BACKGROUND OF THE INVENTION

1. Field of the Invention

The present invention relates to power converters, and more particularly, relates to the synchronous rectifier of power converters.

2. Description of the Related Art

FIG. 1 shows a circuit schematic of a soft switching power converter. It includes a transformer 10 to provide isolation from line input $V_{IN}$ to the output $V_O$ of the power converter for safety. Switches 20 and 30 develop a half bridge circuit to switch the transformer 10. A switching circuit (SW CIRCUIT) 90 generates switching signals $S_H$ and $S_L$ for switching the switches 20 and 30 respectively. A leakage inductance of a primary winding $N_P$ of the transformer 10 and capacitors 41 and 42 form a resonant tank. The leakage inductance L and the equivalent capacitance C of capacitors 41 and 42 determine the resonance frequency $f_0$ of the resonant tank.

$$f_0 = \frac{1}{2\pi\sqrt{L \times C}} \quad (1)$$

The transformer 10 transfers the energy from the primary winding $N_P$ to the secondary windings $N_{S1}$ and $N_{S2}$ of the transformer 10. Rectifiers 61 and 62 and a capacitor 65 perform the rectification and filtering for generating the output $V_O$. A voltage regulation device (such as a zener diode) 70, a resistor 71 and an optical coupler 80 form a regulation circuit coupled to the output $V_O$. The optical coupler 80 is further coupled to the switching circuit 90 for developing the feedback loop of the converter to regulate the output $V_O$. The switching circuit 90 generates the switching signals $S_H$ and $S_L$ in response to the feedback loop signal.

Although the soft switching power converter can achieve high efficiency and low EMI (electric-magnetic interference) performance, the forward voltage of rectifiers 61 and 62 still causes significant power losses. The object of present invention is to provide the synchronous rectifying circuit for switching power converter to achieve higher efficiency.

BRIEF SUMMARY OF THE INVENTION

An exemplary embodiment of a synchronous rectifier for a switching power converter is provided and comprises a power transistor, a diode, and a control circuit. The power transistor and the diode are coupled to a transformer and an output of the power converter for the rectification. The control circuit generates a drive signal to switch on the power transistor once the diode is forward biased. The control circuit comprises a phase-lock circuit which generates an off signal to switch off the power transistor in response to a pulse width of the drive signal. The phase-lock circuit further reduces the pulse width of the drive signal in response to a feedback signal. The feedback signal is correlated to an output load of the power converter.

Another exemplary embodiment of a synchronous rectifier for a switching power converter is provided and comprises a power transistor, a diode, and a control circuit. The power transistor and the diode are coupled to a transformer for rectification. The control circuit generates a drive signal for switching on the power transistor once the diode is forward biased. The control circuit comprises a phase-lock circuit. The phase-lock circuit is coupled to disable the drive signal for switching off the power transistor in response to a pulse width of the drive signal. The pulse width of the drive signal is shorter than a turned-on period of the diode.

In some embodiments, the control circuit comprises a maximum-period circuit. The maximum-period circuit generates a maximum-period signal coupled to turn off the power transistor for limiting an on time of the power transistor. The control circuit further comprises an inhibit circuit. The inhibit circuit generates an inhibit signal. The inhibit signal is a one-shot signal that is coupled to inhibit a turned-on state of the power transistor after the power transistor is turned off.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
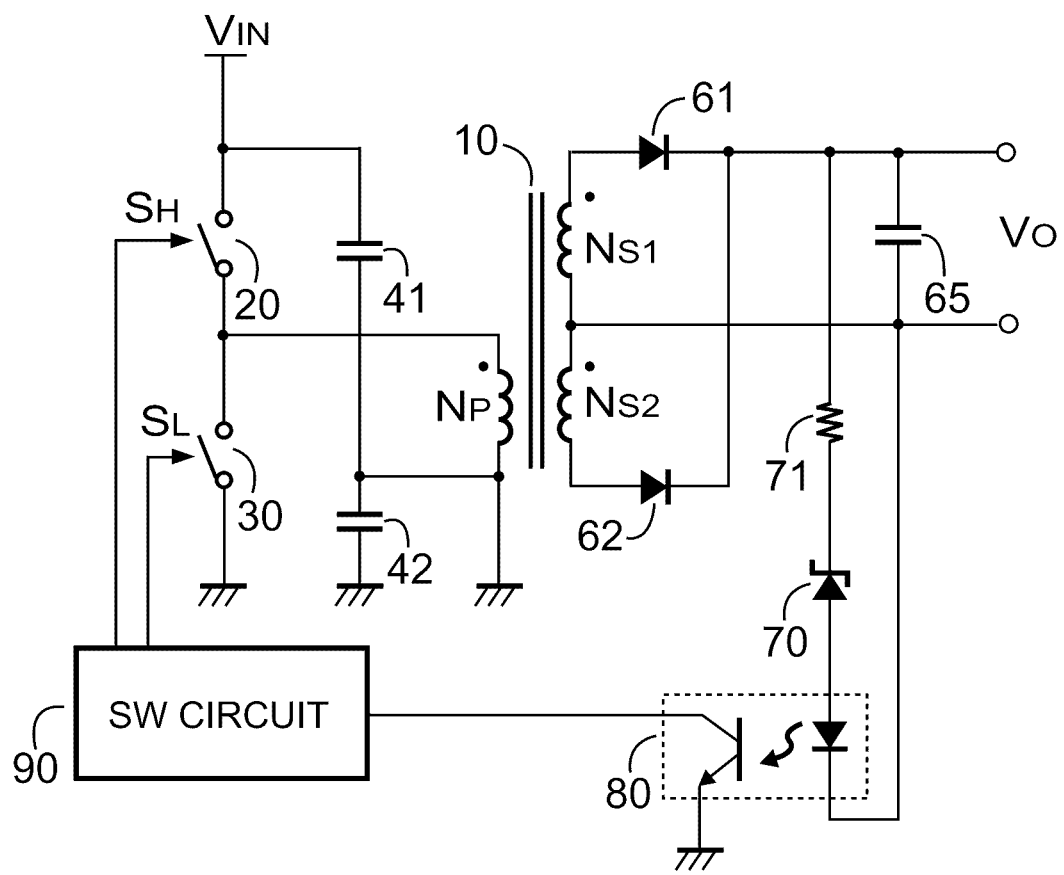
FIG. 1 shows a circuit schematic of a soft switching power converter.
Figure 2:
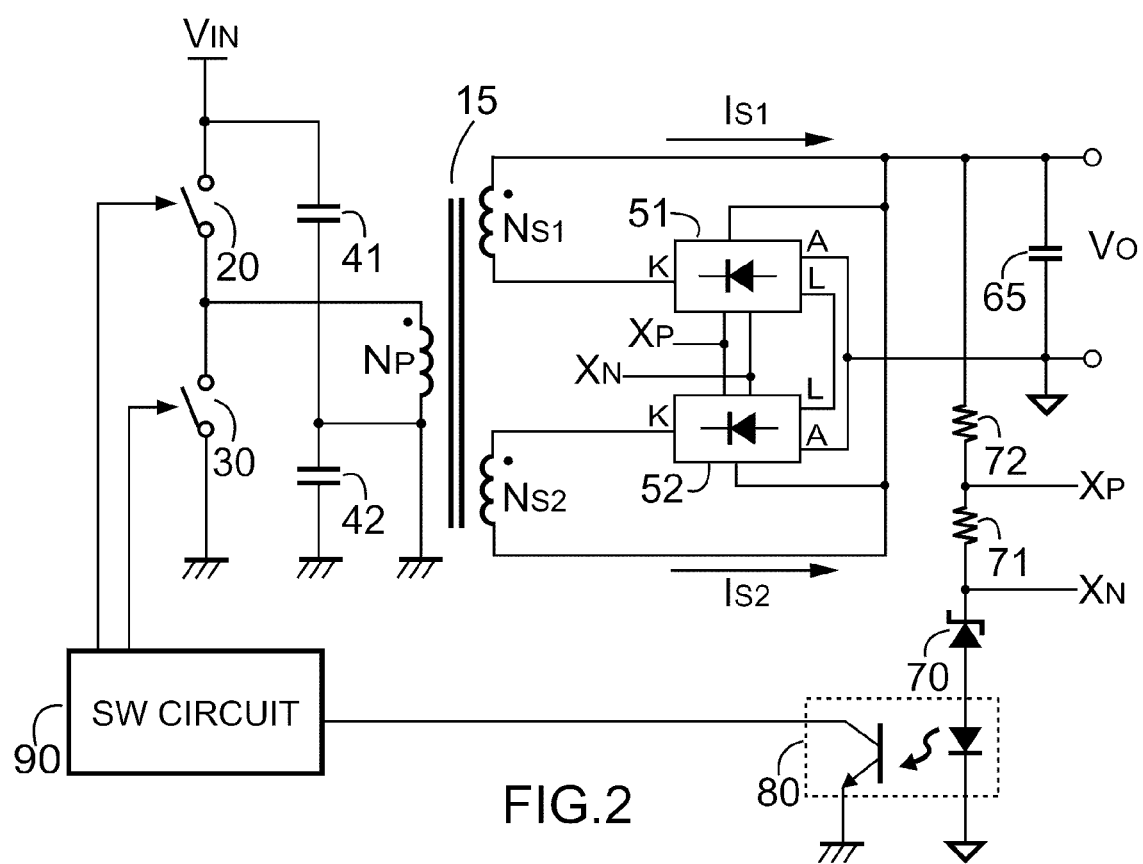
FIG. 2 shows a preferred embodiment of synchronous rectifiers for a resonant power converter according to the present invention.

FIG. 2 shows a resonant power converter with integrated synchronous rectifiers (synchronous rectifying circuits). The power converter includes a transformer 15 having a primary winding $N_P$ and secondary windings $N_{S1}$ and $N_{S2}$. A leakage inductance of the primary winding $N_P$ of the transformer 15 and capacitors 41 and 42 form a resonant tank. The primary winding $N_P$ of the transformer 15 has two switches 20 and 30 for switching the primary winding $N_P$ of the transformer 15. A synchronous rectifying circuit 51 has a cathode terminal K connected to the secondary winding $N_{S1}$. An anode terminal A of the synchronous rectifying circuit 51 is connected to the output ground of the power converter. Another synchronous rectifying circuit 52 has a cathode terminal K connected to the secondary winding $N_{S2}$ and an anode terminal A also connected to the output ground of the power converter. A capacitor 65 performs a filtering operation for generating an output $V_O$.

The synchronous rectifying circuit 51 includes a first power transistor, a first diode and a first control circuit. The synchronous rectifying circuit 52 includes a second power transistor, a second diode and a second control circuit. The synchronous rectifying circuits 51 and 52 generate a lock signal L to prevent synchronous rectifying circuit 51 and 52 from turning on simultaneously. The lock signal L prevents the turn-on of the second power transistor when the first diode or the first power transistor is turned on. The lock signal L prevents the turn-on state of the first power transistor when the second diode or the second power transistor is turned on. Furthermore, the synchronous rectifying circuits 51 and 52 have input terminals $X_P$ and $X_N$ coupled to a feedback loop to receive a feedback signal. A voltage regulation device (such as a zener diode) 70, resistors 71 and 72, and an optical coupler 80 form a regulation circuit to regulate the output $V_O$ of the power converter. The input terminals $X_P$ and $X_N$ are connected to the resistor 72.

Figure 3:
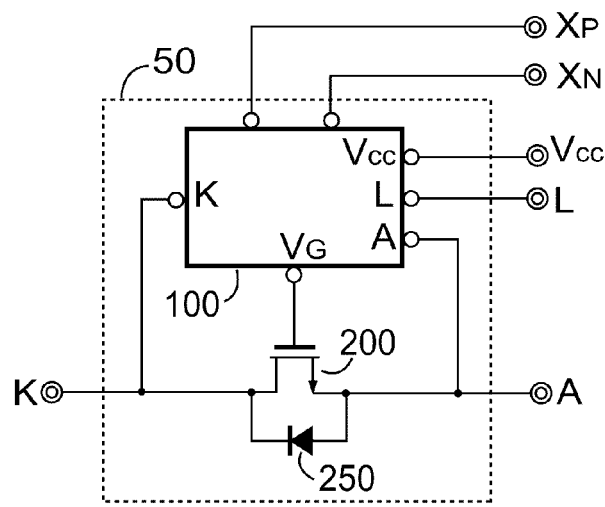
FIG. 3 is a schematic diagram of an integrated synchronous rectifier according to an embodiment of the present invention.

FIG. 3 is the schematic diagram of a synchronous rectifying circuit 50. It represents the circuit of the synchronous rectifying circuit 51 or 52. The synchronous rectifying circuit 50 includes a power transistor 200, a diode 250 and a control circuit 100. The control circuit 100 generates a drive signal $V_G$ to control the power transistor 200. The diode 250 is connected to the power transistor 200 in parallel. The diode 250 is a physical diode or a parasitic device of the power transistor 200. The power transistor 200 is connected between the cathode terminal K and the anode terminal A. The cathode terminal K is coupled to the secondary winding of the transformer 10. The anode terminal A is coupled to the output $V_O$ of the power converter. The control circuit 100 will generate an on signal to enable the drive signal $V_G$ and turn on the power transistor 200 once the diode 250 is forward biased. The control circuit 100 will generate an off signal to disable the drive signal $V_G$ and turn off the power transistor 200 in response the period of the on signal. A lock terminal outputs the lock signal L to show the on/off of the power transistor 200. The input terminals $X_P$ and $X_N$ are used for receiving the feedback signal.

Figure 4:
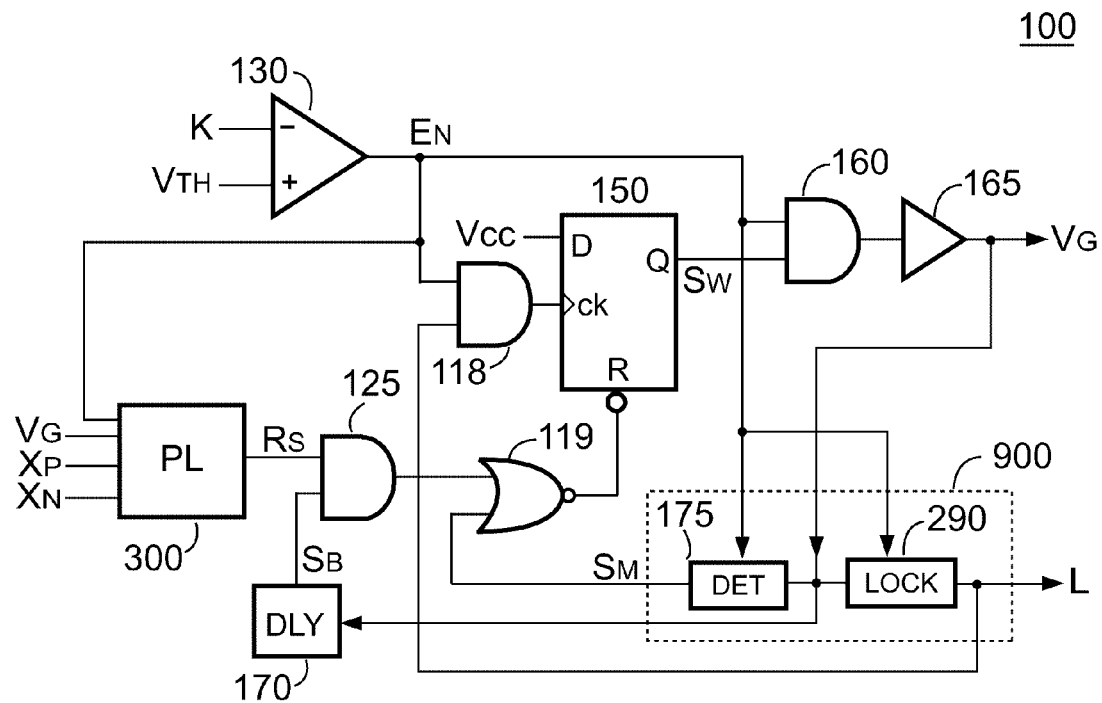
FIG. 4 is a preferred embodiment of a control circuit for the synchronous rectifier according to the present invention.

FIG. 4 shows a schematic diagram of a preferred embodiment of the control circuit 100. It includes a phase-lock circuit (PL) 300, an arbiter circuit 900, and a controller. The controller is developed by a flip-flop 150, a comparator 130, a delay circuit (DLY) 170, a NOR gate 119, AND gates 125, 118, 160, and an output buffer 165.

The comparator 130 has a threshold voltage $V_{TH}$ connected to its positive input. The negative input of the comparator 130 is coupled to the cathode terminal K. The output of comparator 130 generates the on signal $E_N$. Through the AND gate 118, the on signal $E_N$ and the lock signal L are coupled to the clock-input terminal ("ck") of the flip-flop 150. Therefore, the drive signal $V_G$ can only be enabled once the lock signal L is disabled. The reset-input terminal ("R") of the flip-flop 150 is controlled by an output of the NOR gate 119. The output (signal $S_W$) of the flip-flop 150 and the on signal $E_N$ are connected to the AND gate 160. The flip-flop 150 is operated as a latch circuit. The output of the AND gate 160 is connected to the output buffer 165. The drive signal $V_G$ is generated at the output of the output buffer 165 for controlling the power transistor 200.

The arbiter circuit 900 includes a lock circuit (LOCK) 290 and a detection circuit (DET) 175. The lock circuit 290 generates the lock signal L. The detection circuit 175 generates a reset signal $S_M$ to turn off the drive signal $V_G$ and the power transistor 200 under abnormal conditions. The reset signal $S_M$ is connected to the reset-input terminal ("R") of the flip-flop 150 through the NOR gate 119 to clear the flip-flop 150.

The drive signal $V_G$ will be generated to turn on the power transistor 200 once the voltage of the cathode terminal K is lower than the threshold voltage $V_{TH}$ (the diode 250 is turned on). An input of the NOR gate 119 is connected to an output of the AND gate 125. The first input of the AND gate 125 is coupled to the output (a blanking signal $S_B$) of the delay circuit 170. The input of the delay circuit 170 is connected to receive the drive signal $V_G$. The delay circuit 170 provides a blanking time to achieve a minimum on time for the drive signal $V_G$. The phase-lock circuit 300 generates an off signal $R_S$ connected to the second input of the AND gate 125. The off signal $R_S$ is generated in response to the on signal $E_N$ and the signal of the input terminals $X_P$ and $X_N$. The off signal $R_S$ is developed to turn off of the drive signal $V_G$. The voltage of the cathode terminal K will be lower than the voltage of the threshold voltage $V_{TH}$ when the diode 250 is conducted and forward biased. Therefore, the power transistor 200 can only be turned on after the diode 250 is turned on, which achieves the soft-switching of the power transistor 200. Furthermore, the drive signal $V_G$ will be disabled and the power transistor 200 will be turned off when the diode 250 is reversely biased. Furthermore, the off signal $R_S$ is coupled to turn off the power transistor 200 in accordance with the operation of the phase-lock circuit 300. The pulse width of the drive signal $V_G$ is shorter than the turned-on period of the diode 250.

Figure 5:
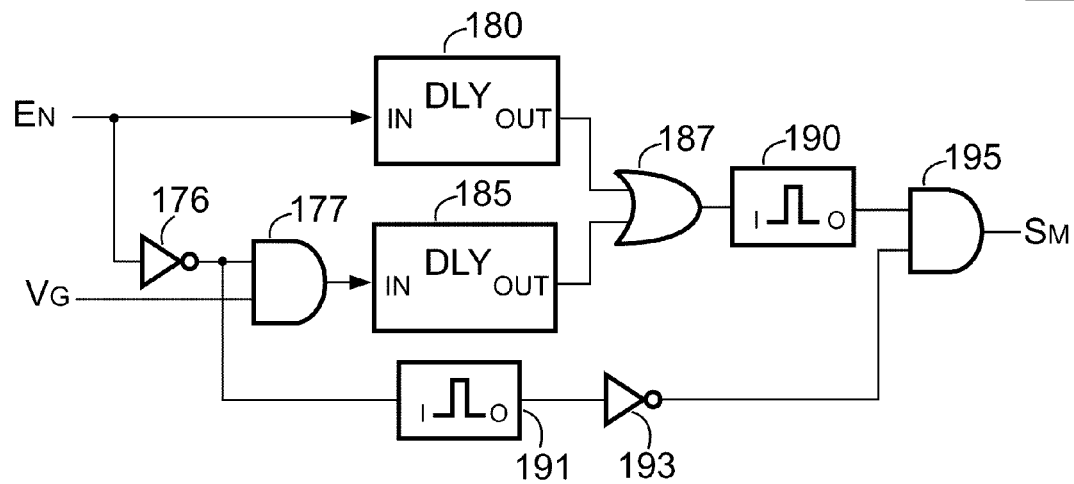
FIG. 5 is a circuit schematic of a detection circuit according to the present invention.

FIG. 5 shows the circuit schematic of the detection circuit 175. It includes a maximum-period circuit, a inhibit circuit, and a protection circuit. The maximum-period circuit is formed by a delay circuit (DLY) 180 in this embodiment. The protection circuit is formed by a AND gate 177 and a delay circuit (DLY) 185 in this embodiment. The inhibit circuit is developed by a pulse generation circuit 191 in this embodiment. The on signal $E_N$ is connected to the input of the delay circuit 180. The delay circuit 180 generates a maximum-period signal connected to an input of an OR gate 187. The on signal $E_N$ is further coupled to an input of the AND gate 177 through an inverter 176. Another input of the AND gate 177 is connected the drive signal $V_G$. An output of the AND gate 177 is connected to the delay circuit 185. The delay circuit 185 generates a protection signal connected to another input of the OR gate 187. An output of the OR gate 187 is coupled to trigger a pulse generation circuit 190. An output of the pulse generation circuit 190 is connected to an input of an AND gate 195. The on signal $E_N$ is further coupled to the input of the pulse generation circuit 191 through the inverter 176. The pulse generation circuit 191 generates an inhibit signal coupled to another input of the AND gate 195 via an inverter 193. The AND gate 195 generates the reset signal $S_M$ coupled to turn off the drive signal $V_G$. Therefore, the maximum-period signal is coupled to turn off the power transistor 200 for limiting the on time of the power transistor 200. The inhibit signal is coupled to inhibit the turn-on state of the power transistor 200 after the power transistor 200 is turned off. The inhibit signal is a one-shot signal. The pulse width of the one-shot signal is controlled by the pulse generation circuit 191. The protection signal is also coupled to turn off the power transistor 200 for limiting the current of the power transistor 200 during the abnormal condition.

Figure 6:
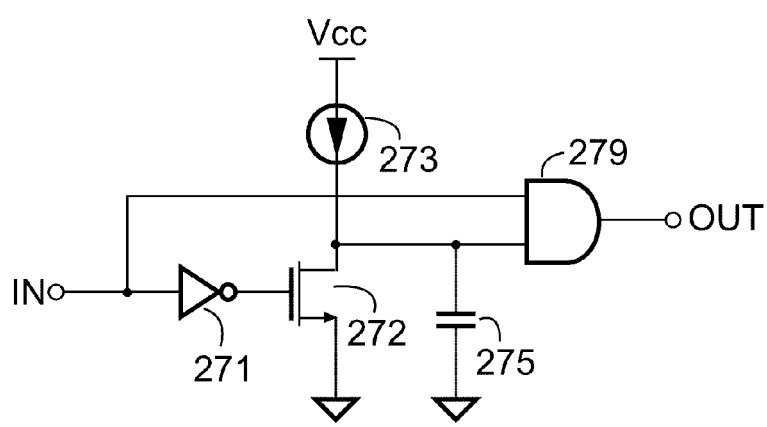
FIG. 6 is a circuit schematic of a delay circuit according to an embodiment of the present invention.

FIG. 6 is the circuit schematic of the delay circuit. A current source 273 is connected to charge a capacitor 275. A transistor 272 is connected to discharge the capacitor 275. An input signal IN is connected to control the transistor 272 through an inverter 271. The input signal IN is further connected to an input of an AND gate 279. Another input of the AND gate 279 is coupled to the capacitor 275. Once the input signal IN is enabled, an output of the AND gate 279 will generate an output signal OUT. The delay time is determined by the current of the current source 273 and the capacitance of the capacitor 275.

Figure 7:
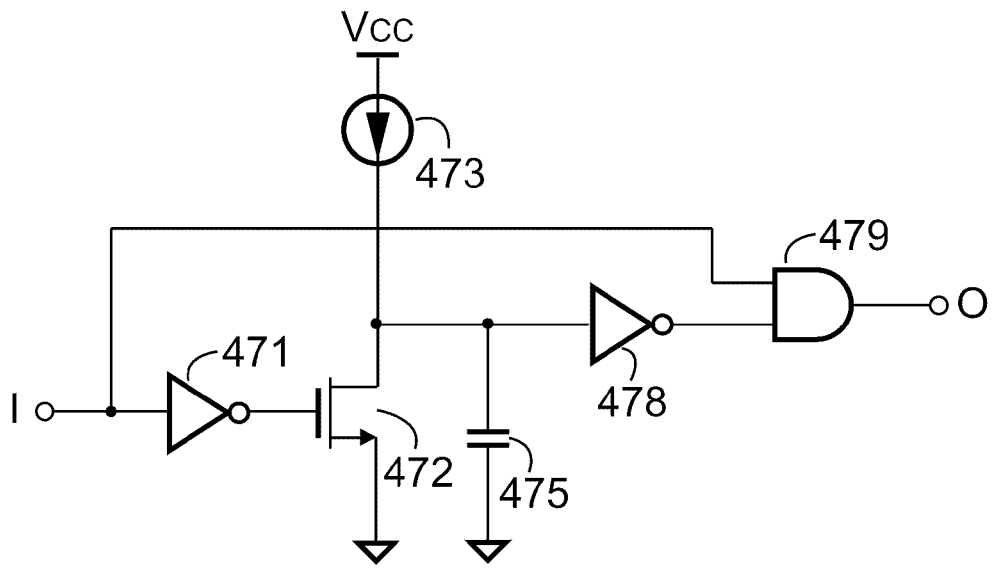
FIG. 7 is a pulse generation circuit.

FIG. 7 shows the pulse generation circuits. A current source 473 is connected to charge a capacitor 475. A transistor 472 is connected to discharge the capacitor 475. A signal I is connected to control the transistor 472 through an inverter 471. The signal I is further connected to an input of an AND gate 479. Another input of the AND gate 479 is coupled to the capacitor 475 via an inverter 478. An output of the AND gate 479 generates an output pulse signal O. The pulse width of the output pulse signal O is determined by the current of the current source 473 and the capacitance of the capacitor 475. In the embodiment of FIG. 7, the output pulse signal O generated by the AND gate 479 serves as the inhibit signal coupled to one input of the AND gate 195 via the inverter 193 of FIG. 5.

Figure 8:
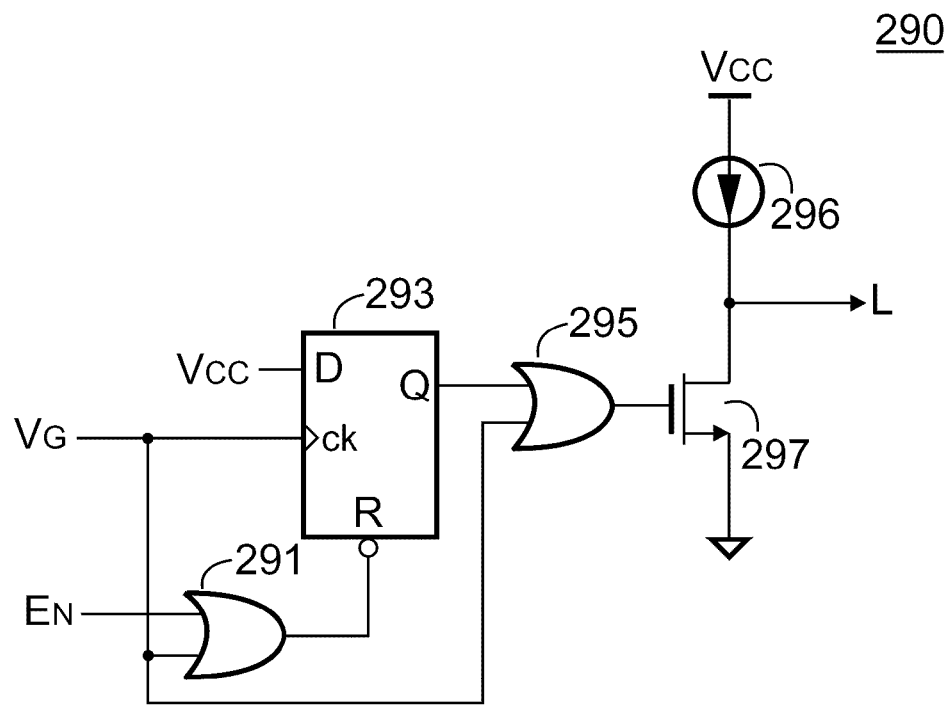
FIG. 8 is a lock circuit according to a preferred embodiment of the present invention.

FIG. 8 is the schematic of the lock circuit 290. A flip-flop 293 is turned on by the drive signal $V_G$. The drive signal $V_G$ and the on signal $E_N$ are coupled to an OR gate 291. An output of the OR gate 291 is connected to reset the flip-flop 293. An output of the flip-flop 293 is connected to an input of an OR gate 295. Another input of the OR gate 295 is coupled to receive the drive signal $V_G$. An output of the OR gate 295 drives a transistor 297. The transistor 297 generates the lock signal L. A current source 296 provides a pull high effect for the lock signal L. The lock signal L is generated in response to the enable of the drive signal $V_G$. The lock signal L will be disabled when the drive signal $V_G$ and the on signal $E_N$ are disabled. The drive signal $V_G$ can only be initiated and enabled once the lock signal L is disabled.

Figure 9:
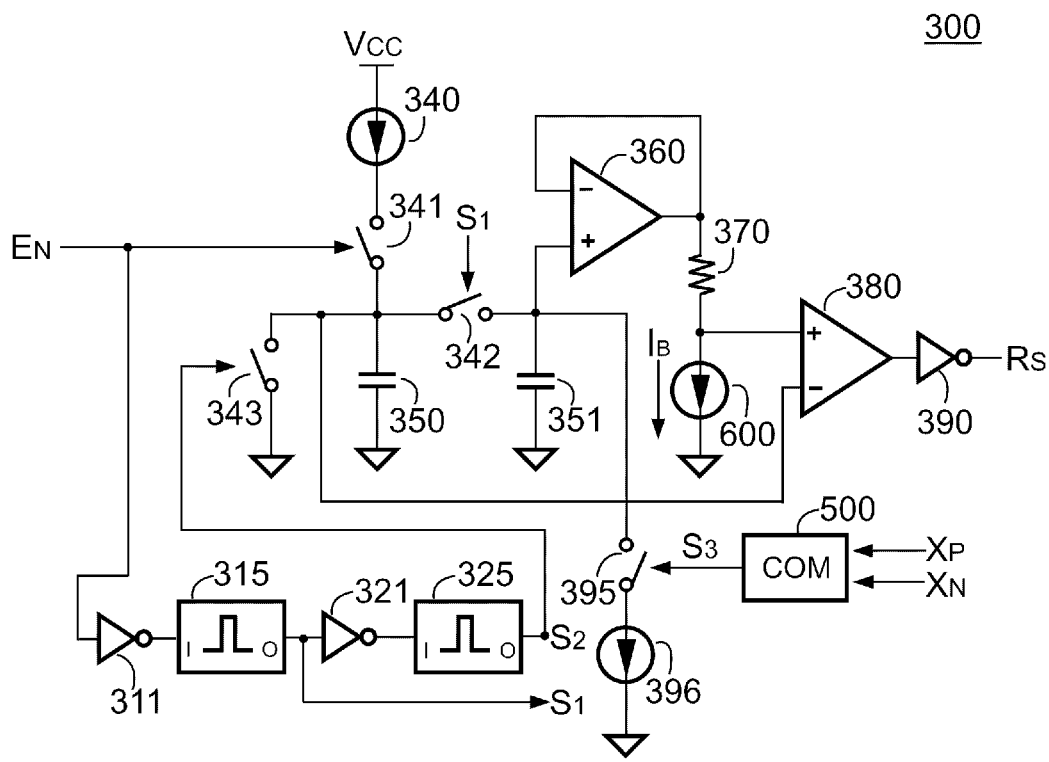
FIG. 9 is a phase-lock circuit according to a preferred embodiment of the present invention.

FIG. 9 is the phase-lock circuit 300. A switch 341, a current source 340, and a capacitor 350 form a charge circuit. The on signal $E_N$ is coupled to enable the charge of the capacitor 350 through the switch 341 and the current source 340. A ramp signal is thus generated at the capacitor 350. The on signal $E_N$ is further coupled to generate a sample signal $S_1$ and a clear signal $S_2$ through pulse generation circuits 315 and 325 and inverter 311 and 321. A switch 342 and a capacitor 351 form a sampling circuit. The sample signal $S_1$ is coupled to sample the signal of the capacitor 350 to the capacitor 351 via the switch 342. A hold signal is thus generated in the capacitor 351. After the sampling, the clear signal S2 is coupled to clear the capacitor 350 through a switch 343. The level of the hold signal of the capacitor 351 is correlated to the enable period of the on signal $E_N$. The hold signal of the capacitor 351 is coupled to an input of a comparator 380 through a buffer amplifier 360 and a resistor 370. A current source 600 is further coupled to the resistor 370 to generate a voltage drop at the resistor 370. Another input of the comparator 380 is coupled to receive the ramp signal. The output of the comparator 380 is connected to an inverter 390. The inverter 390 generates the off signal $R_S$ to disable the drive signal $V_G$. The current $I_B$ of the current source 600 is adjusted to generate the off signal $R_S$. The pulse width of the drive signal $V_G$ is thus shorter than the turn-on period of the diode 250.

In additional, a current source 396 is coupled to discharge the capacitor 351 and decrease the level of the hold signal via a switch 395. A comparison circuit (COM) 500 (phase detector) generates a restart signal $S_3$ to enable the switch 395 for the discharge in response to the feedback signal on the input terminals $X_P$ and $X_N$. The comparison circuit 500 is utilized to reduce the pulse width of the drive signal $V_G$ when the feedback signal is over a threshold 510 shown in FIG. 10. The feedback signal is higher than the threshold 510 during the light load of the power converter. Therefore, the pulse width of the drive signal $V_G$ will be reduced when the output $V_O$ has a load changed from a heavy load to a light load.

Figure 10:
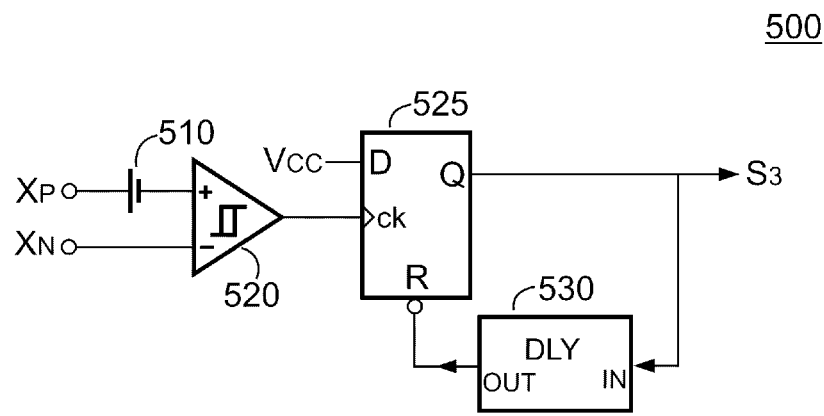
FIG. 10 is a comparison circuit according to a preferred embodiment of the present invention.

FIG. 10 is the circuit of the comparison circuit 500. A comparator 520 having the threshold 510 is coupled to the input terminals $X_P$ and $X_N$. The output of the comparator 520 is connected to turn on a flip-flop 525. The flip-flop 525 generates the restart signal $S_3$. The restart signal $S_3$ is further coupled to reset the flip-flop 525 through a delay circuit 530.

Figure 11:
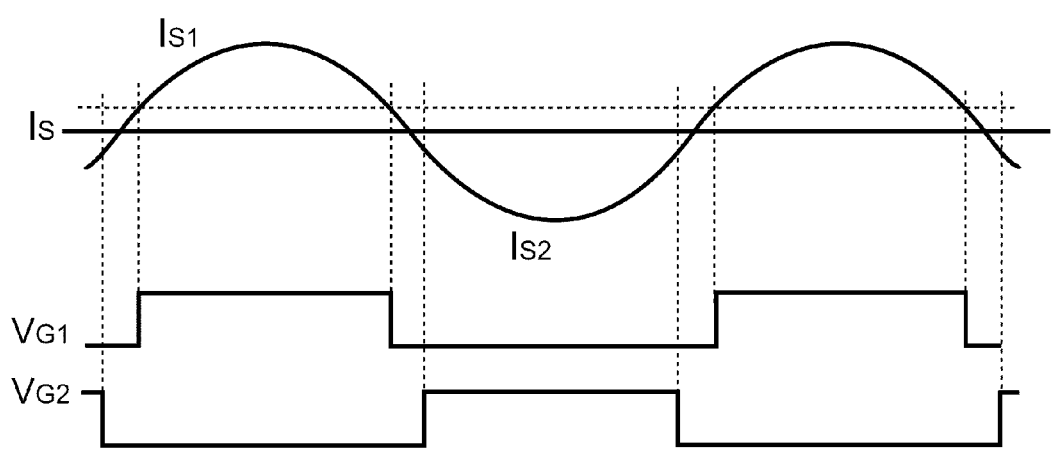
FIG. 11 shows key waveforms of synchronous rectifiers according to the present invention.

FIG. 11 shows key waveforms of the synchronous rectifying circuit. The switching current $I_S$ of the transformer 15 includes $I_{S1}$ and $I_{S2}$. The drive signals $V_{G1}$ and $V_{G2}$ are the drive signal $V_G$ of the synchronous rectifying circuit 51 and the synchronous rectifying circuit 52 respectively.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronous rectifying circuit for a switching power converter comprises:
    a transformer having a primary winding and a secondary winding, wherein the secondary winding has a first terminal and a second terminal, and the first terminal of the secondary winding is coupled to an output of the switching power converter;
    a power transistor and a diode, wherein both of the power transistor and the diode are coupled between the second terminal of the secondary winding and an output ground of the switching power converter for rectification; and
    a control circuit generating a drive signal to switch on the power transistor once the diode is forward biased, wherein the control circuit comprises:
    a phase-lock circuit generating an off signal to switch off the power transistor in response to a pulse width of the drive signal;
    wherein the phase-lock circuit further reduces the pulse width of the drive signal in response to a feedback signal; and
    wherein the feedback signal is correlated to an output load of the switching power converter.

2. The synchronous rectifying circuit as claimed in claim 1, wherein the control circuit further comprises:
    a maximum-period circuit generating a maximum-period signal;
    wherein the maximum-period signal is coupled to turn off the power transistor for limiting an on time of the power transistor.

3. The synchronous rectifying circuit as claimed in claim 1, wherein the control circuit further comprises:
    an inhibit circuit generating an inhibit signal;
    wherein the inhibit signal is a one-shot signal that is coupled to inhibit a turn-on state of the power transistor after the power transistor is turned off.

4. The synchronous rectifying circuit as claimed in claim 1, wherein the phase-lock circuit comprises:
   a charge circuit generating a ramp signal when the drive signal is enabled;
   a sampling circuit generating a hold signal in accordance with the level of the ramp signal; and
   a comparator generating the off signal in response to comparison of the ramp signal and the hold signal;
   wherein the level of the hold signal is correlated to the pulse width of the drive signal.

5. The synchronous rectifying circuit as claimed in claim 4, wherein the phase-lock circuit further comprises:
   a phase detector generating a restart signal coupled to decrease the level of the hold signal;
   wherein the restart signal is generated when the feedback signal is over a threshold.

6. The synchronous rectifying circuit as claimed in claim 5, wherein the phase detector comprises:
   a comparator receiving the feedback signal;
   a flip-flop, coupled to the comparator, turned on by an output of the comparator and generating the restart signal; and
   a delay circuit, coupled to the flip-flop, receiving the restart signal to reset the flip-flop.

7. A synchronous rectifier for a switching power converter comprises:
   a transformer having a primary winding and a secondary winding, wherein the secondary winding has a first terminal and a second terminal, and the first terminal of the secondary winding is coupled to an output of the switching power converter;
   a power transistor and a diode, wherein both of the power transistor and the diode are coupled between the second terminal of the secondary winding and an output ground of the switching power converter for rectification; and
   a control circuit generating a drive signal for switching on the power transistor once the diode is forward biased, wherein the control circuit comprises:
   a phase-lock circuit coupled to disable the drive signal for switching off the power transistor in response to a pulse width of the drive signal;
   wherein the pulse width of the drive signal is shorter than a turned-on period of the diode.

8. The synchronous rectifier as claimed in claim 7, wherein the phase-lock circuit is further coupled to change the pulse width of the drive signal in response to a feedback signal, and the feedback signal is correlated to an output load of the switching power converter.

9. The synchronous rectifier as claimed in claim 7, wherein the control circuit further comprises:
   a maximum-period circuit generating a maximum-period signal;
   wherein the maximum-period signal is coupled to turn off the power transistor for limiting an on time of the power transistor.

10. The synchronous rectifier as claimed in claim 7, wherein the control circuit further comprises:
   an inhibit circuit generating an inhibit signal;
   wherein the inhibit signal is a one-shot signal that is coupled to inhibit a turned-on state of the power transistor after the power transistor is turned off.

11. The synchronous rectifier as claimed in claim 7, wherein the phase-lock circuit comprises:
   a charge circuit generating a ramp signal when the drive signal is enabled;
   a sampling circuit generating a hold signal in accordance with the level of the ramp signal; and
   a comparator coupled to switch off the drive signal in response to comparison between the ramp signal and the hold signal;
   wherein the level of the hold signal is correlated to the pulse width of the drive signal.

12. The synchronous rectifier as claimed in claim 11, wherein the phase-lock circuit further comprises:
   a phase detector generating a restart signal coupled to decrease the level of the hold signal;
   wherein the restart signal is generated when a feedback signal is over a threshold.

13. The synchronous rectifying circuit as claimed in claim 12, wherein the phase detector comprises:
   a comparator receiving the feedback signal;
   a flip-flop, coupled to the comparator, turned on by an output of the comparator and generating the restart signal; and
   a delay circuit, coupled to the flip-flop, receiving the restart signal to reset the flip-flop.

\* \* \* \* \*